United States Patent [19]

Wagatsuma et al.

[11] Patent Number: 4,965,744
[45] Date of Patent: Oct. 23, 1990

[54] APPARATUS FOR ERASING AND EXTRACTING IMAGE DATA FROM PARTICULAR REGION OF ORIGNAL DOCUMENT

[75] Inventors: Yuki Wagatsuma, Shibata; Hiroshi Kanno, Shiroishi, both of Japan

[73] Assignee: Ricoh Company, Ltd., Tokyo, Japan

[21] Appl. No.: 167,314

[22] Filed: Mar. 11, 1988

[30] Foreign Application Priority Data

Mar. 13, 1987 [JP] Japan .................. 62-58204
Mar. 13, 1987 [JP] Japan .................. 62-58205

[51] Int. Cl.⁵ ...................... G06F 15/66; H04N 1/38
[52] U.S. Cl. .................... 364/518; 358/452; 358/462; 355/218
[58] Field of Search .............. 382/57; 340/723, 724, 340/747, 750, 799; 364/521, 518, 519; 358/426, 444, 445, 452, 453, 462; 355/218, 271

[56] References Cited

U.S. PATENT DOCUMENTS

| 4,078,249 | 3/1978 | Lelke et al. | 364/200 |
| 4,665,555 | 5/1987 | Alker et al. | 382/41 |
| 4,686,579 | 8/1987 | Sakamoto | 358/282 |
| 4,701,805 | 10/1987 | Maeshima | 358/282 |
| 4,736,310 | 4/1988 | Colthorpe et al. | 364/526 |
| 4,760,463 | 7/1988 | Nonoyama et al. | 358/280 |
| 4,775,886 | 10/1988 | Hirosawa | 358/77 |
| 4,786,976 | 11/1988 | Takao et al. | 358/283 |

Primary Examiner—Gary V. Harkcom
Assistant Examiner—Raymond J. Bayerl
Attorney, Agent, or Firm—Oblon, Spivak, McClelland, Maier & Neustadt

[57] ABSTRACT

An apparatus applicable to a digital copier, a digital printer, a printer using a mimeograph and others for specifying a desired region of an original document by use of a marking sheet, and erasing, extracting or otherwise editing a portion of the image of the original document which lies in the particular region. An image of the marking sheet read by an image scanner are converted into two-level pixel data. The pixel data are reduced in density before written in a memory, such that pixels are extracted, or thinned, one out of each predetermined number of pixels in each of the column and row address directions of the memory. One of two differnt image modes is selected: a text mode with applies MTF (modulation transfer function) processing to a text document, and a graphic mode which applies dither processing or like halftone processing to a graphic document. When the marking sheet is to be read, the text mode is set up automatically.

7 Claims, 19 Drawing Sheets

Fig. 5
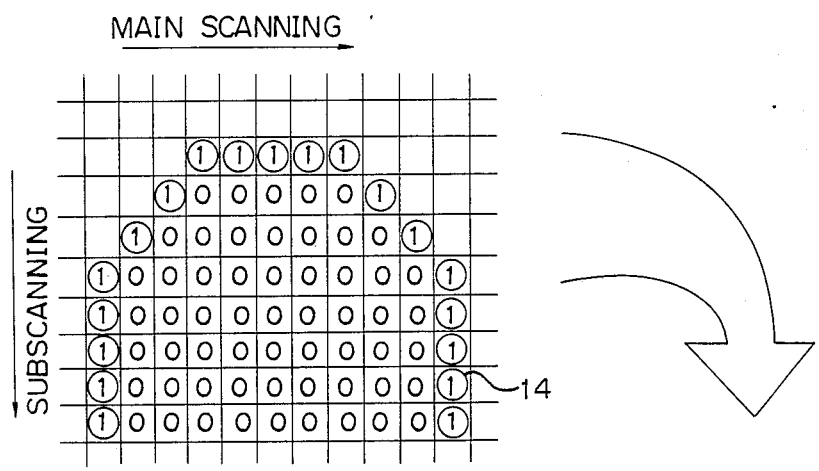
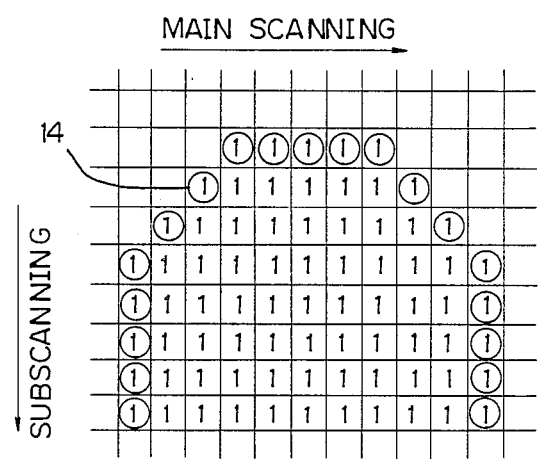
Fig. 6
| A<br>1 | B<br>1 | C<br>1 |
|---|---|---|
| D<br>1 | E<br>0 | F<br>0 |
| G<br>0 | H<br>0 | I<br>0 |

APPARATUS FOR ERASING AND EXTRACTING IMAGE DATA FROM PARTICULAR REGION OF ORIGNAL DOCUMENT

BACKGROUND OF THE INVENTION

The present invention relates to an apparatus for erasing and extracting image data from a particular region of an original document, in which the particular region is specified by an exclusive marking sheet, by reading the sheet prior to the document, storing data associated with the sheet in a memory, and processing an image carried on the document based on the particular region which is stored in the memory. More particularly, the present invention is concerned with such an apparatus which is applicable to a digital copier, a digital printer, a printer using a mimeograph and the like.

An apparatus of the kind described is disclosed in, for example, Japanese Laid-Open Patent Publication (Kokai) No. 61-13867/1986. The apparatus there disclosed reads an original document and an exclusive marking sheet at the same density and stores the resulting data in a memory. For example, assuming that the density at which a document is read is sixteen dots per millimeter, data associated with the marking sheet of format A4 amounts to 15.9 megabits, i.e., $16 \times 16 \times 210 \times 297 = 15.9$ megabits, resulting in the need for an extremely large memory capacity. To reduce the memory capacity required, this prior art apparatus compresses data before storing the data memory and decodes the data after outputting the data from the memory. Such a scheme, however, has various drawbacks in that compressing and decoding data cannot be implemented without resorting to complicated and expensive circuits. Further, since the data are compressed, considerable difficulty is experienced in identifying a particular region specified by a frame in distinction from the rest of the data identifying region located outside of the particular region. Further, the processing applied to data which have been decoded is time-consuming because the amount of data is necessarily increased.

On the other hand, the content of processing may be varied from one kind of document to another, as has been practiced with some prior art digital copiers of the type using such a marking sheet. For example, a different kind of image processing may be applied to each of a text document and a photograph or like graphic document, which includes halftone, for the purpose of enhancing the reproducibility of an output image. Hereinafter, the processing applied to a text document will be referred to as a text mode, and the processing applied to a graphic document as a graphic mode. While in the text mode, data having undergone MTF (Modulation Transfer Function) correction are transformed into two-level data, i.e., black-and-white data by discriminating such data with respect to a predetermined threshold value, whereas in the graphic mode data are transformed by reproducing halftone based on a dither method or the like. However, should the processing associated with the text mode be directly applied to the graphic mode or vice versa, the reproducibility would be lowered to a critical degree. For example, in the case that a solid black image or characters are reproduced by processing them by the dither method which is associated with the graphic mode, the resulting image becomes mere fragments which are discontinuous due to local omission of data. A person, therefore, has to select either one of the text and graphic modes depending upon the kind of a document to be used.

Since an exclusive marking sheet previously described is similar in condition to a text document, it naturally has to be processed in the text mode. However, there is a fear that the sheet is inadvertently processed in the graphic mode, bringing about the above-described occurrence which would lead to erroneous recognition of a marked region of a document.

SUMMARY OF THE INVENTION

It is, therefore, an object of the present invention to provide an apparatus for erasing and extracting a particular region of a document which needs a minimum of memory capacity.

It is another object of the present invention to provide an apparatus for erasing and extracting a particular region of a document which is capable of rapidly identifying the particular region in distinction from the other region.

It is another object of the present invention to provide an apparatus for erasing and extracting a particular region of a document which automatically applies image processing in the text mode to an exclusive marking sheet.

It is another object of the present invention to provide an apparatus for erasing and extracting a particular region of a document which is applicable to a digital copier, a digital printer, a printer using a mimeograph and the like and selectively sets up the text and graphic modes in matching relation to the kind of a document.

It is another object of the present invention to provide a generally improved apparatus for erasing and extracting a particular region of a document.

These and other objects are achieved in accordance with the present invention by providing a novel apparatus for reading a document image printed on an original document and an image of a marking sheet which marks a desired region of the document image together with a mark provided on the marking sheet, storing data associated with the marking sheet in a memory, and processing the document image, which is typically read after the marking sheet, in a predetermined editing mode, including a binarizer for reading the marking sheet and document image to convert the sheet and document image into two-level pixel data, a density conversion circuit for converting density of the two-level image data associated with an image of the marking sheet and controlling the memory such that the pixel data are written in the memory, an inside/outside decision circuit for discriminating the pixel data stored in the memory with respect to whether or not the pixel data relate to locations on the document image inside or outside of the marked region and applying processing to the pixel data inside and outside of the marked region based on the predetermined editing mode, and an image processor for reading the pixel data associated with the marking sheet and stored in the memory and those associated with the document and outputted by the binarizer while synchronizing the pixel data to each other, and applying image processing to the document in the predetermined editing mode.

Further, in accordance with the present invention, there is provided a novel apparatus for reading a document image printed on a document and which is read by a scanner and an image of a marking sheet which marks a desired region of the document image, storing data associated with the marked region in a memory, and applying image processing to the document image, which is typically read after the marking sheet, in a predetermined editing mode and a predetermined image mode, including an AD (analog-to-digital) converter for reading the image of the marking sheet and the document image and converting resulting image data into digital image data, an image signal processor for processing the digital image data in the predetermined image mode to transform the digital image data into two-level pixel data and writing the pixel data in the memory, a sequence controller for determining if it is the document image or the image of the marking sheet that has been read by the scanner and commanding the image signal processor a selected image mode, and an editing circuit supplied with the pixel data associated with the image of the marking sheet and read out of the memory and the pixel data associated with the document image and outputted by the image signal processor for applying image processing to the document image in the predetermined editing mode.

BRIEF DESCRIPTION OF THE DRAWINGS

A more complete appreciation of the invention and many of the attendant advantages thereof will be readily obtained as the same become better understood by reference to the following detailed description when considered in connection with the accompanying drawings, wherein:

FIGS. 5 and 6 are schematic illustrations representative of decision processing applied to pixel data which are stored in the memory;

DESCRIPTION OF THE PREFERRED EMBODIMENTS

Figure 1:
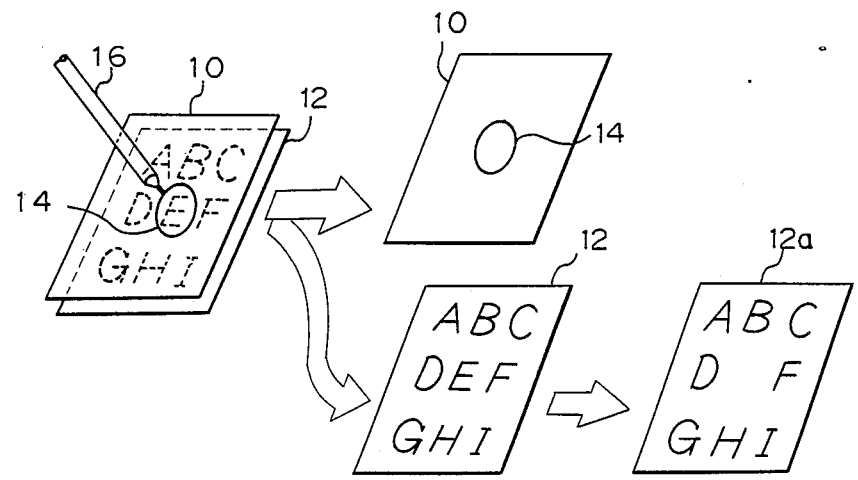
FIG. 1 is a schematic illustration showing processing for erasing and extracting a particular region of a document as marked by an marking sheet.

Referring now to the drawings, wherein like reference numerals designate identical or corresponding parts throughout the several views, two different embodiments of the apparatus in accordance with the present invention will next be described in detail.

FIRST EMBODIMENT

The first embodiment which will be explained promotes rapid processing for the discrimination between the inside and the outside of a particular region marked and reduces memory capacity required.

FIG. 1 schematically shows how an image which lies in a certain region of a document marked may be entirely erased or omitted. First, a person lays on a document 12 a transparent or semitransparent marking sheet 10 which is adapted to specify a desired region of the document 12 to be erased. Then, the operator writes with a felt pen or like implement 16 a solid line 14 which marks the particular region in distinction from the rest, i.e., character "E". Subsequently, the operator operates an erase key 20 of an operation board 18, FIG. 2, for setting up an erase mode which erases the whole image lying inside of the line 14. A light emitting diode (LED) 22 is associated with the erase key 20 and turns on when the latter is operated. When the operator desires to extract only the image which lies in the region marked by the sheet 10, the operator may depress an extract key 24 of the operation board 18 for selecting an extract mode. An LED 26 is associated with the extract key 24. Also provided on the operation board 18 is a start key 28. In the above condition, an image scanner as will described later is activated to read the sheet 10 and the document 12 in this order, and the resulting data are processed independently of each other. Finally, an image printer is driven to produce an image 12a in which the marked region, i.e., character "E" is omitted.

Figure 3:
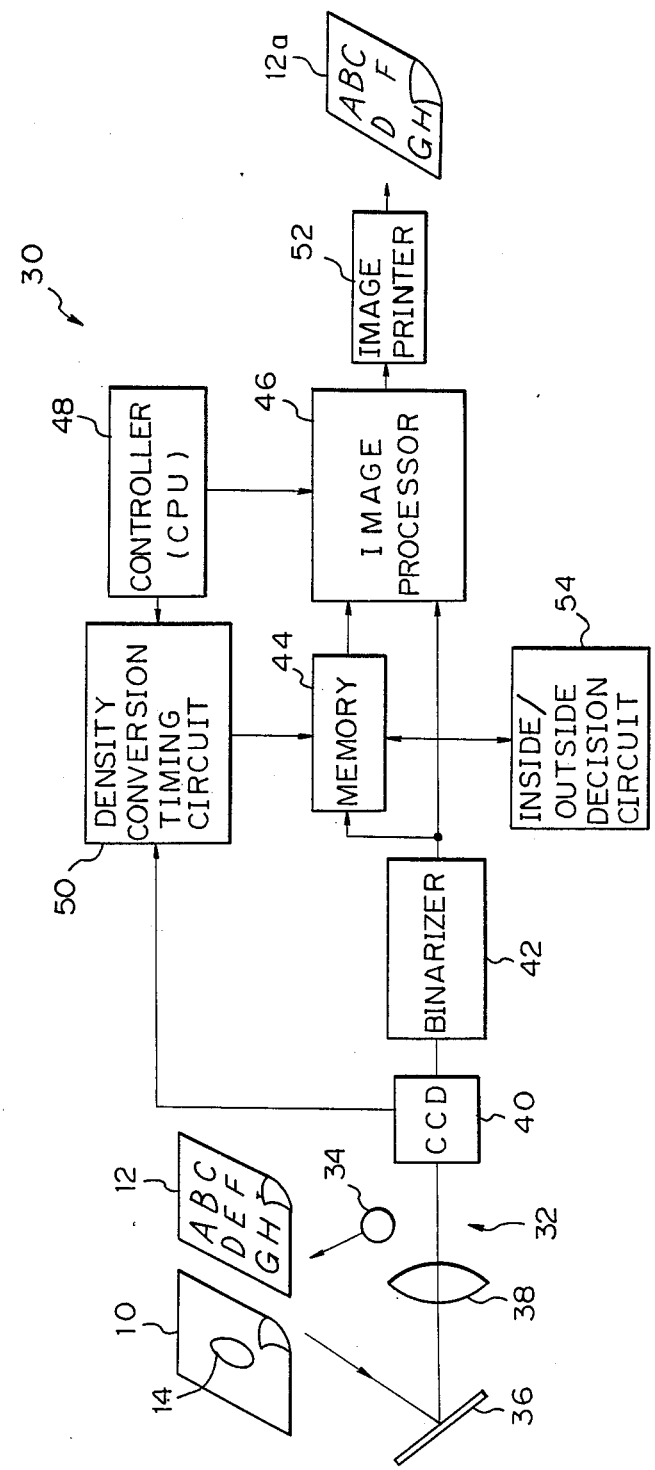
FIG. 3 is a schematic block diagram showing the overall construction of the apparatus of FIG. 2.

Referring to FIG. 3, an apparatus in accordance with this particular embodiment is shown in a block diagram and generally designated by the reference numeral 30. The marking sheet 10 and the document 12 are read by an image scanner 32 in this order. The image scanner 32 is made up of a light source 34, a mirror 36 and a CCD (charge coupled device) 40. The marking sheet 10 is illuminated by light which issues from the light source 34 and, therefore, read together with the line 14 by the CCD 40 by way of the mirror 36 and lens 38. The output of the CCD 40 is fed to a binarizer 42 to be thereby converted into two-level pixel data having density of 16 dots per millimeter in both the main and subscanning directions, i.e. pixel data of sixteen dots per millimeter. The sixteen dots per millimeter, two-level pixel data are applied to a memory 44 and an image processing circuit, or image processor, 46. A controller 48 is adapted to control the entire apparatus 30 and is constituted by a CPU (central processing unit), a ROM (read only memory), a RAM (random access memory), an I/O (input/output) interface and others. A density conversion timing circuit 50 delivers read/write commands and address signals to the memory 44 in response to instructions which are generated by the controller 48. The two-level data sequentially fed from the binarizer 42 to the memory 44 are thinned at a rate of seven out of eight, thereby transforming the pixel data to a density which is as low as two dots per millimeter.

Figure 4:
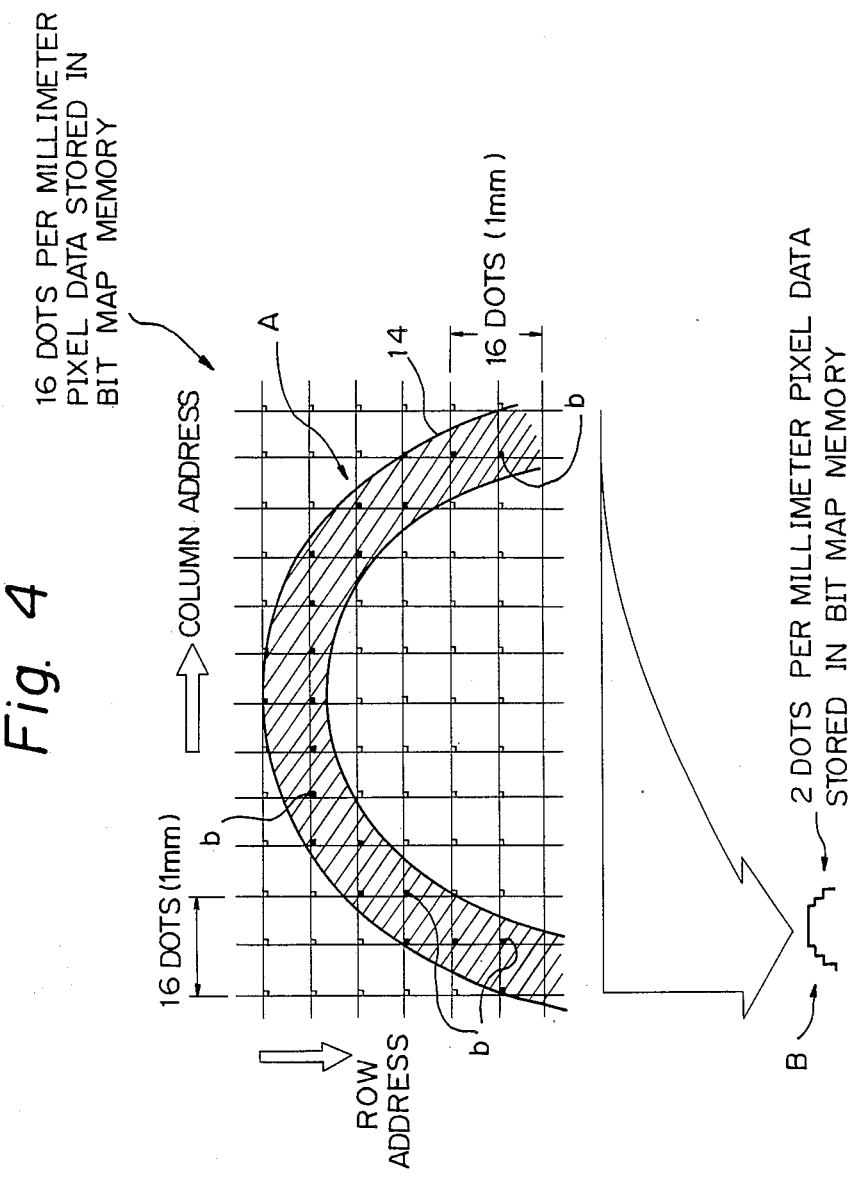
FIG. 4 is a schematic illustration showing two-level pixel data which are stored in a memory.

In FIG. 4, there is shown how the two-level image data are written in the memory 44. An area A indicated by hatching in the figure is representative of a size in which the line 14 which would be written if the sixteen dots per millimeter, two-level pixel data from the binarizer 42 were not thinned. On the other hand, an area B is representative a size in which the line 14 is produced when the sixteen dots per millimeter pixel data are thinned at the rate of seven out of eight into two dots permillimeter pixel data, as previously stated. Specifically, the density conversion timing circuit 50 extracts only one pixel out of each eight pixels of the hatched area A in both the column and row address directions. The pixel data extracted so, i.e., two dots per millimeter pixel data are represented by solid dots b in FIG. 4. These pixel data b only are written in the memory 44 in a small configuration, as indicated by the area B. This reduces the memory capacity required to 1/64, compared to the sixteen dots per millimeter pixel data without thinning. This is because the thinning processing is effected in both the main and subscanning directions, i.e. $\frac{1}{8} \times \frac{1}{8} = 1/64$. Since the pixel data undergone thinning are not coded at all, the shape of data written in the memory 44 as represented by B appears analogous to that of original sixteen dots per millimeter pixel data as represented by A, meaning a reduction of the image to $\frac{1}{8}$.

Referring to FIG. 3 again, an inside/outside decision circuit 54 applies decision processing to the pixel data which are written in the memory 44 as stated above. By decision processing is meant filling the entire region which is marked by the line 14 with the same data as that of the line 14, i.e. logical ONE. More specifically, as shown in FIG. 5, in the raster data constituted by the pixel data of line 14 as represented by ONEs and those of the region inside of the line 14 as represented by ZEROs, ZEROs are changed to ONEs by the decision processing. For such decision processing, among those pixels of a surrounding pixel matrix shown in FIG. 6, pixels A, B, C, D, F, G, H and I which surround a particular pixel E to be processed are used. For example, the particular pixel represented by E is discriminated by using an equation $E = E + (C + F) \times (D + G)$, in which the symbols "+" and "×" are representative of ORing and ANDing, respectively. Details of the decision processing will be described in detail later.

After the marking sheet 10, the document 12 is read by the image scanner 32. The output of the image scanner 32, i.e., that of CCD 40 is fed to the binarizer 42 to be thereby converted into sixteen dots per millimeter pixel data. Simultaneously, in response to a command from the density conversion timing signal 50, the two dots per millimeter data previously written in the memory 44 and representative of the line 14 and the region inside of the line 14 are read out timed such that they coincide with the sixteen dots per millimeter pixel data which are representative of the document 12. Specifically, the same data are repeatedly read out eight consecutive times in the main scanning direction and, likewise, the same data are read eight consecutive times in the subscanning direction. The data associated with the sheet 10 as read out of the memory 44 and the data associated with the document 12 as fed from the binarizer 42 are routed to the image processor 46. The image processor 46 erases that region of the document 12 which is defined by the line 14 that is written on the sheet 10. The resulting image data are delivered to a laser printer or like image printer 52 to be printed out thereby. The resulting document image 12a, therefore, is void of the image region which is marked by the line 14, i.e. character E.

Hereinafter will be described specific constructions of the memory 44, density conversion timing circuit 50, inside/outside decision circuit 54 and image processor 46. It is to be noted that the other structural elements can be implemented with those which per se are known in the art and, therefore, will not be described for the sake of simplicity.

Figure 7A:
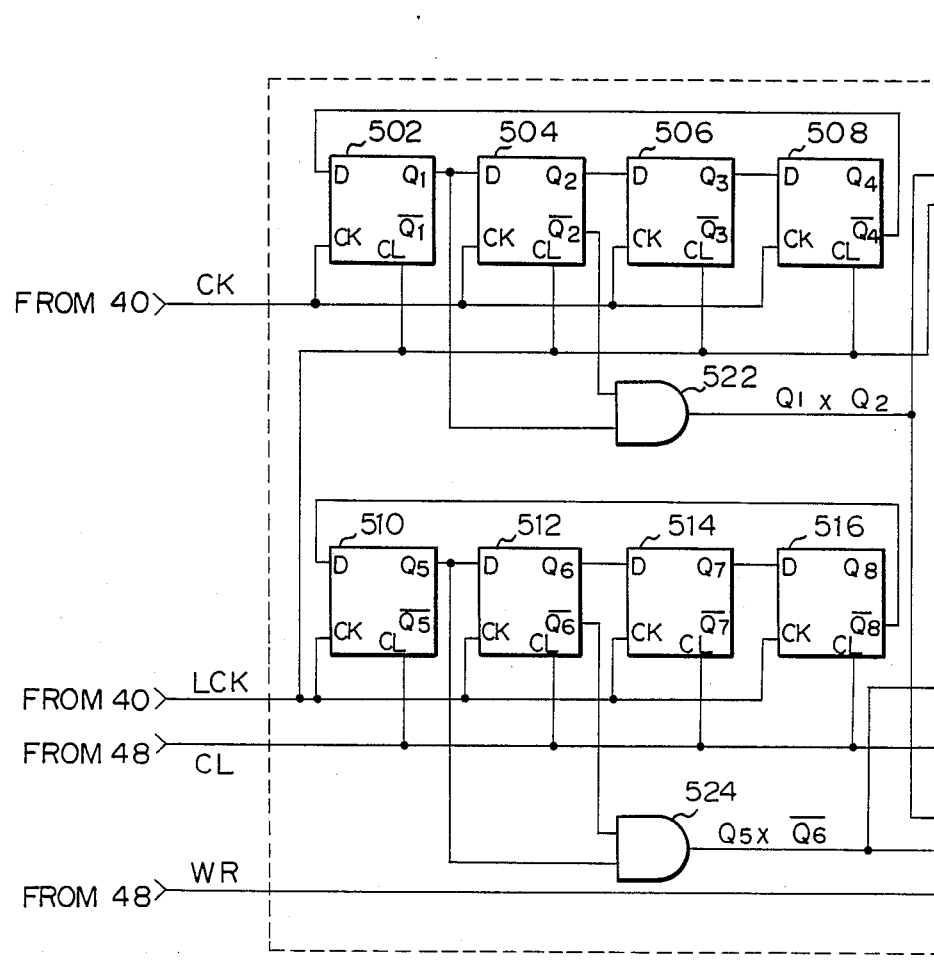
FIG. 7 is a schematic block diagram showing a specific construction of a density conversion timing circuit and that of a memory in accordance with the first embodiment.
Figure 7B:
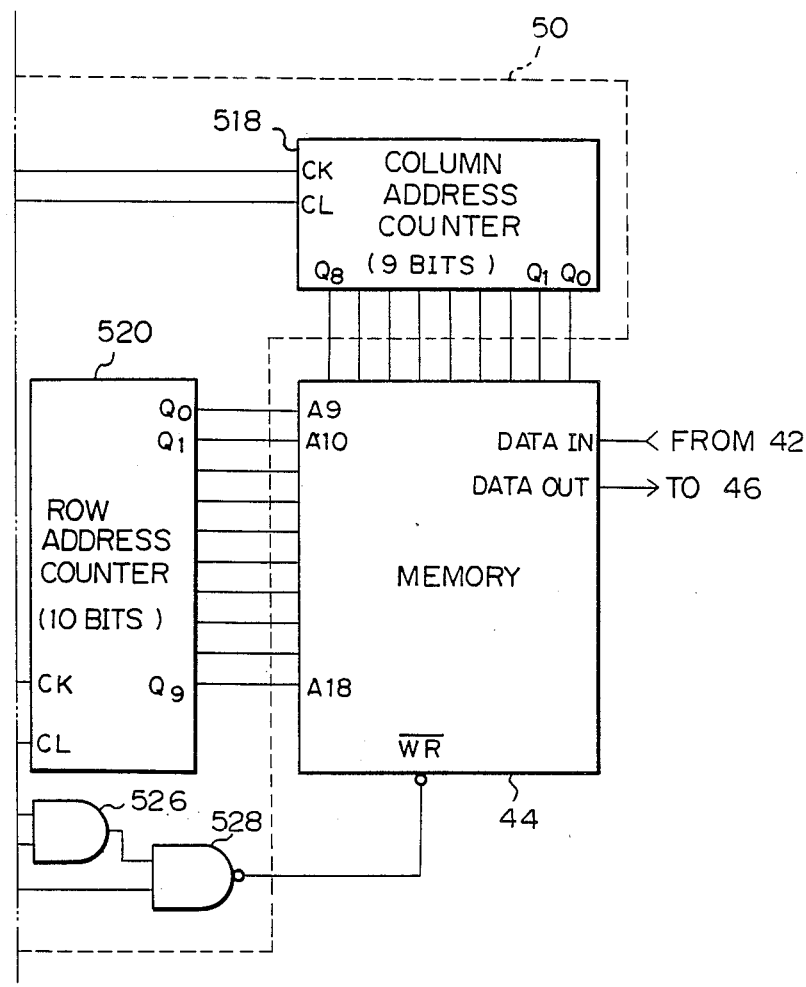
Figure 8:
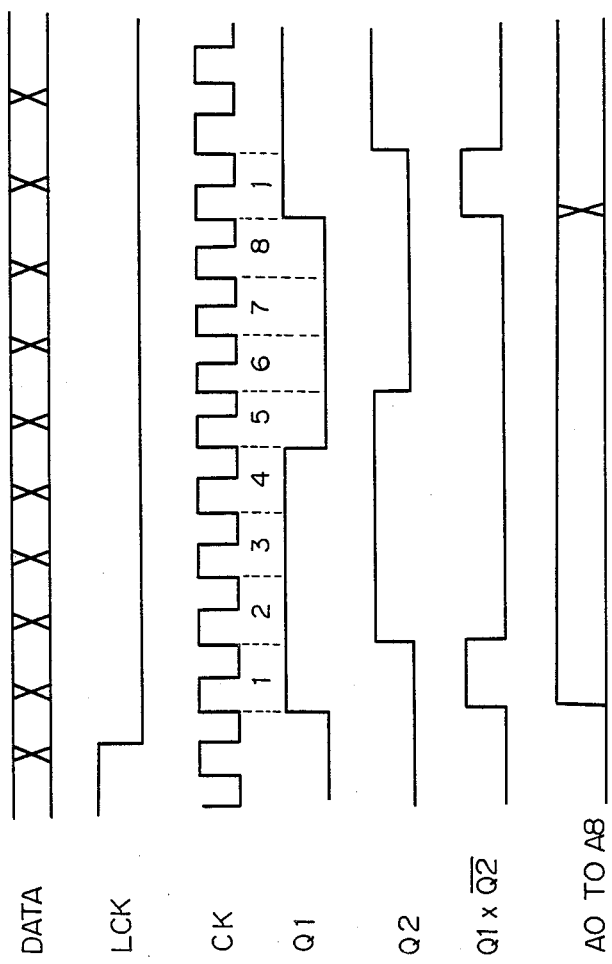
FIG. 8 is a timing chart showing signals which appear in various portions of the circuitry shown in FIG. 7.

FIG. 7 shows a combined specific construction of the density conversion timing circuit 50 and memory 44 while FIG. 8 shows various signals in a timing chart. As shown, the memory 44 is implemented with a so-called bit map memory in which pixels are associated with addresses in one-to-one correspondence. To write data associated with the marking sheet 10 of at least format B4 at the density of two dots per millimeter, the memory 44 is sized 256 (millimeters)×2 (dots per millimeter)=512 (dots) in the column direction and 350×2=700 (1024 dots) in the row direction, i.e. 512 (columns)×1024 (rows). The density conversion timing circuit 50 is made up of four D flip-flops 502, 504, 506 and 508 which in combination constitute a first $\frac{1}{8}$ frequency division network, four D flip-flops 510, 512, 514 and 516 constituting a second $\frac{1}{8}$ frequency division network, a 9-bit column address counter 518, a 10-bit row address counter 520, and gates 522, 524, 526 and 528. Two-level data DATA from the binarizer 42 are fed to the memory 44 clocked by synchronizing signals CK and LCK which are generated by the CCD 40. While the synchronizing signal CK is outputted by the CCD 40 for each pixel in the main scanning direction, the synchronizing signal LCK is outputted by the same on a line-by-line basis with respect to the subscanning direction. A clear signal CL and a write signal WR are fed from the controller 48.

First, the operation for writing pixel data in the memory 44 will be described. The synchronizing signal CK is applied to the four D flip-flops 502, 504, 506 and 508 so as to cause the flip-flops 502 and 504 to produce signals $Q_1$ and $\overline{Q}_2$, respectively. These signals $Q_1$ and $\overline{Q}_2$ are fed to the gate 522 which then ANDs these signals, i.e. $Q_1 \times \overline{Q}_2$. As shown in FIG. 8, the signal $Q_1 \times \overline{Q}_2$ remains high level only for the duration of one pixel out of eight consecutive pixels in the main scanning direction. At each positive-going edge of the signal $Q_1 \times \overline{Q}_2$, the 9-bit column address counter 518 which is generating a column address is incremented (see wave-forms of signals $A_0$ to $A_8$ shown in FIG. 8). The column address counter 518 and four D flip-flops 502, 504, 506 and 508 are cleared by the synchronizing signal LCK so as to set up synchronization in the main scanning direction, the column address in the main scanning direction being incremented once for each eight pixels. The synchronizing signal LCK, like the signal CK, is fed to the four D flip-flops 510, 512, 514 and 516 to cause the flip-flops 510 and 512 to produce signals $Q_5$ and $\overline{Q_6}$, respectively. The signals $Q_5$ and $\overline{Q_6}$ are ANDded by the gate 524 to become a signal $Q_5 \times \overline{Q_6}$. This output $Q_5 \times \overline{Q_6}$ of the gate 524 remains high level only for the duration of one line out of eight consecutive lines in the subscanning direction. At each positive-going edge of the signal $Q_5 \times \overline{Q_6}$, the 10-bit row address counter 520 which is generating a row address is incremented. Cleared by the clear signal CL, the row-address counter 520 and four D flip-flops 510, 512, 514 and 516 set up synchronization in the subscanning direction, the row address being incremented once for each eight lines. The output $Q_1 \times \overline{Q_2}$ of the gate 522 and that $Q_5 \times \overline{Q_6}$ of the gate 524 are ANDded by the gate 526, and the resulting AND is fed to the gate 528. Also applied to the gate 528 is the write signal WR which is outputted by the controller 48. The output $\overline{WR}$ of the gate 528 is delivered to the memory 44. When the signal $\overline{WR}$ has a low level, the memory 44 stores two-level pixel data DATA applied to its terminal DATA IN in a particular memory cell which is being accessed. When the signal $\overline{WR}$ has a high level, the memory 44 outputs data from a particular memory cell being accessed via its terminal DATA OUT. In this manner, since the signal $\overline{WR}$ fed to the memory 44 causes the sigal $Q_1 \times \overline{Q_2}$ which appears once for each eight pixels and the signal $Q_5 \times \overline{Q_6}$ which appears once for each eight lines to be ANDded, data are produced at a rate of one pixel per sixty-four $(=8 \times 8)$ pixels and stored in the memory 44. The other data are not stored in the memory 44. Stated another way, the other data are thinned. Needless to mention, it is only when the controller 48 generates the write signal WR that data are written in the memory 44.

Image data stored in the memory 44 are read thereoutof in the same order as the document 12 is read by the image scanner 32 and written in the memory 44. Specifically, since data can be always read so long as the output $\overline{WR}$ of the gate 528 has a high level, all that is required is sequentially incrementing the address. The column address counter 518 generating a column address is not changed throughout eight pixels of image data which are read out of the document 12, so that data are read out of the memory 44 with the address unchanged. This is true with the row address also, i.e., the row address is unchanged throughout eight consecutive rows.

Figure 9:
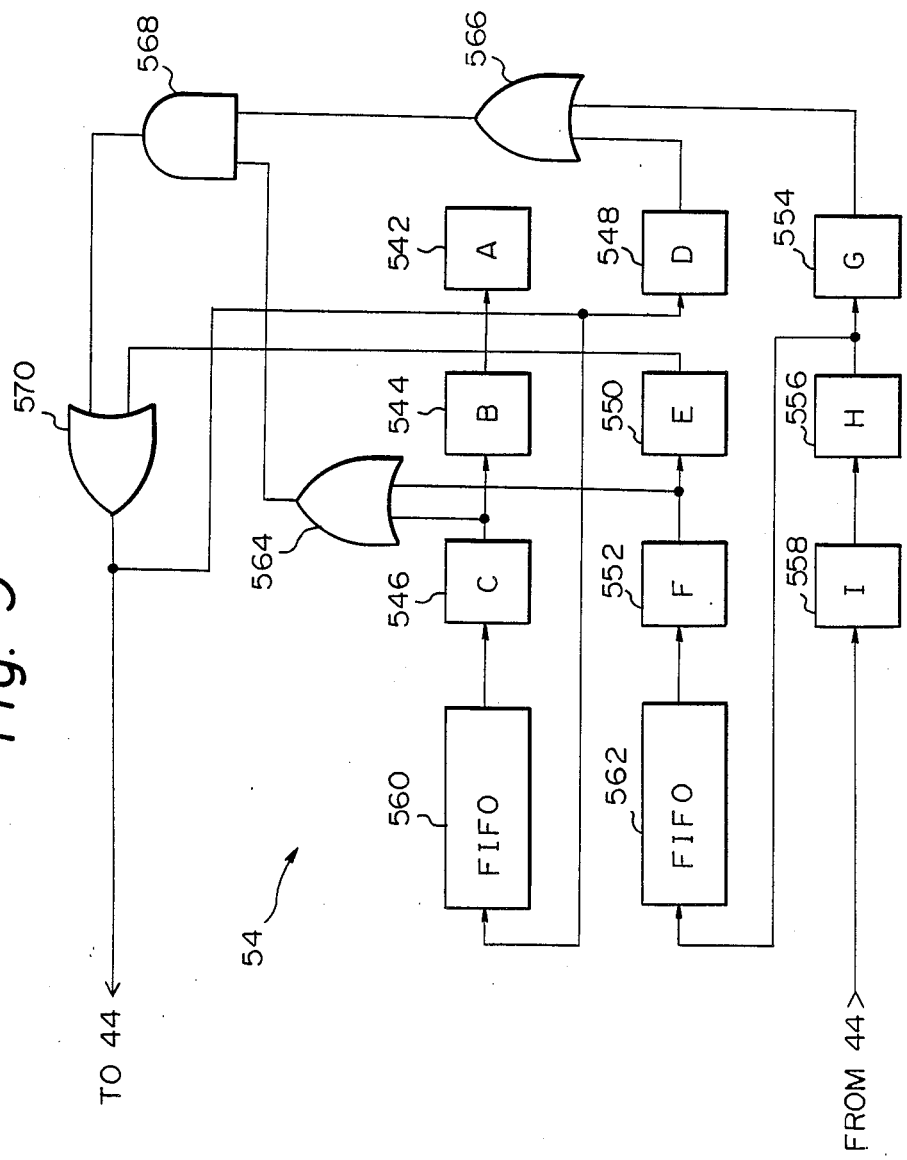
FIG. 9 is a schematic block diagram showing a specific construction of an inside/outside decision circuit.

Referring to FIG. 9, a specific construction of the inside/outside decision circuit 54 is shown. As shown, the decision circuit 54 is constituted by D flip-flops 542, 544, 546, 548, 550, 552, 554, 556 and 558 which are arranged in association with the surrounding pixel matrix of FIG. 6 in order to latch the surrounding pixels, FIFO (first-in-first-out) memories 560 and 562 adapted to store data of the immediately preceding line and those of the line occurred two lines before, and gates 564, 566, 568, and 570. The image data DATA are fed from the memory 44 to the flip-flop 558 and subjected to the processing which fills the line 14 and the whole region defined by the line 14, FIG. 5, with ONEs, the resulting data being delivered via the gate 570 to the memory 44. For details of the procedure for replacing ZEROs with ONEs in a particular area of an image memory as mentioned, a reference may be made to Japanese Laid-Open Patent Publication (Kokai) No. 62-58508/1987.

Figure 10A:
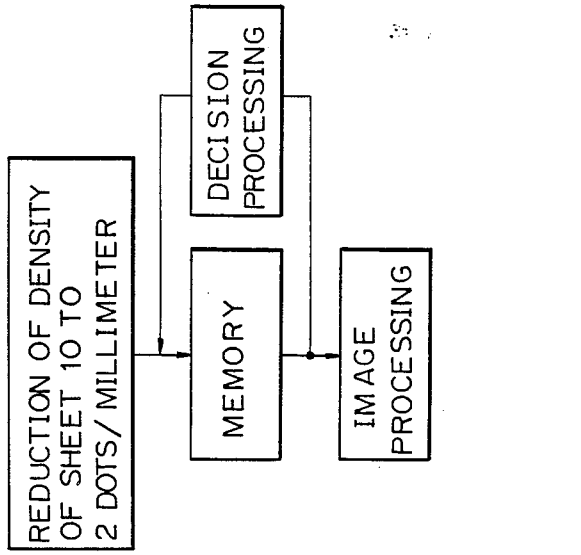
FIGS. 10A to 10C are flowcharts each demonstrating a particular timing of the inside/outside decision circuit during execution of its processing.
Figure 10B:
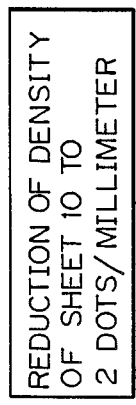
Figure 10C:
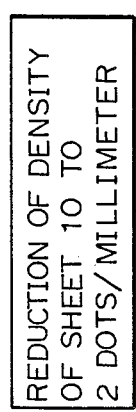

The decision performed by the inside/outside decision circuit 54 as discussed above may be programmed in any of three different flows which are shown in FIGS. 10A to 10C. In FIG. 10A, the decision is effected at the same time as the image data associated with the marking sheet 10 are read out, i.e., as the two-level pixel data from the binarizer 42 are thinned by the density conversion timing circuit 50 to the density of two dots per millimeter, the result being written in the memory 44. In FIG. 10B, the thinned two dots per millimeter pixel data associated with the sheet 10 are directly written in the memory 44 and discriminated later when they are read out of the memory 44. In FIG. 10C, the thinned two dots per millimeter pixel data which are directly written in the memory 44 are read out by raster-scanning the memory 44 when the data associated with the document 12 are read by the image scanner 32 and, then, discriminated, the result being written in the memory 44 again.

Figure 11:
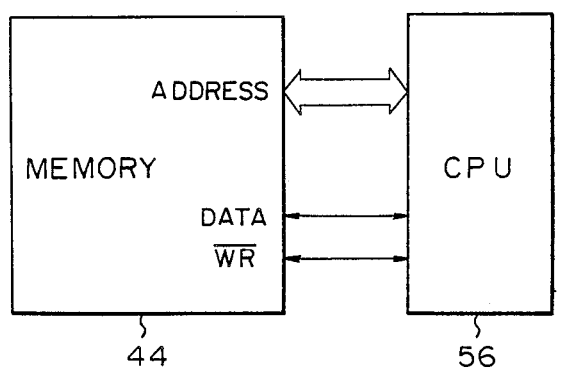
FIG. 11 is a schematic block diagram showing another specific construction for the decision processing.

Alternatively, as shown in FIG. 11, the decision processing stated above may be executed by a CPU 56 which accesses the memory 44. In this case, the CPU 56 will read a plurality of times those pixels which surround a pixel to be discriminated in the memory 44, store data of the surrounding pixels in a register which is built in the CPU 56, perform computation with those data, and writes the result in a particular address of the memory 44. This corresponds to the flow of FIG. 10C.

Figure 12:
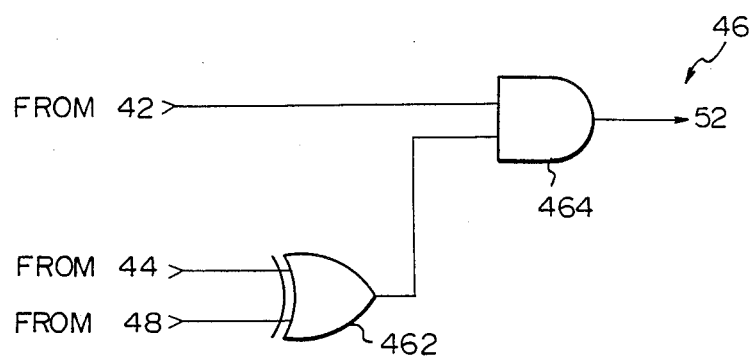
FIG. 12 is a schematic diagram showing a specific construction of an image processing circuit.

Referring to FIG. 12, a specific construction of the image processor 46 is shown. As shown, the image processor 46 is comprised of two gates 462 and 464. The gate 462 is supplied with the data ONEs representative of the line 14 and the inside of the line 14, as shown in FIG. 5, from the memory 44 and an image data extract/erase signal from the controller 48, delivering an output thereof to the gate 464. The gate 464, on the other hand, is supplied with the two-level pixel data from the binarizer 42 while feeding its output to the image printer 52. When the extract/erase signal from the controller 48 has a low level, the output of the memory 44 is directly routed to the gate 464. Since the whole region delimited by the line 14 is a ONE, only those image data in the region of the document which is located outside of the region stored in the register with the marked region region are effective. Consequently, the region other than the marked region becomes all ZERO, i.e. blank. When the extract/erase signal from the controller 48 is high level, the region outside the marked region is all ONE so that only the image data outside of the marked region are effective, the marked region being all ZERO and, therefore, blank.

Figure 2:
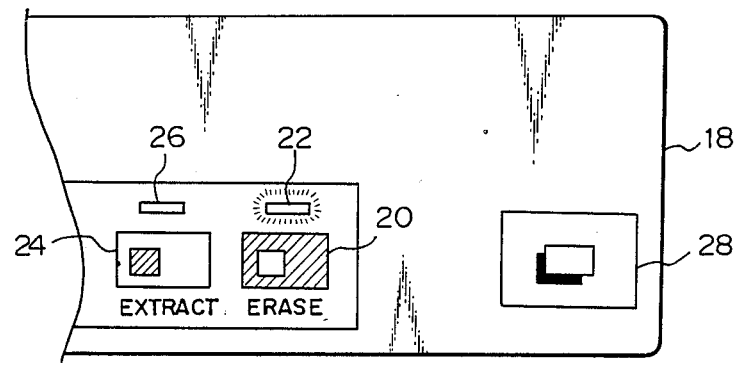
FIG. 2 is a fragmentary view of an operation board of an apparatus which is representative of a first embodiment of the apparatus in accordance with the present invention.

The operation board 18 shown in FIG. 2 is constructed as follows. When the start key 28 on the operation board 18 is depressed under a usual condition in which neither the erase key 20 nor the extract key 24 is depressed, the document 12 is read by the image scanner 32 and, after a series of processing stated earlier, it is reproduced by the image printer 52. When either the erase key 20 or the extract key 24, especially the latter as illustrated, is depressed and, then, the start key 28, data associated with the marking sheet 10 are written in the memory 44. In such a case, as the start key 28 is depressed again, the document 12 which follows the sheet 10 is subjected to the previously stated image processing resulting that the image 12a to be produced by the image printer 52 is void of the image as surrounded by the line 14, i.e. character E.

In the illustrative embodiment, extra processing may be added for preventing data which discriminate the desired region and the rest from each other from being omitted. For example, there may be added processing which causes even a single pixel out of eight pixels to be written in the memory 44 if it is a ONE. Further, the equation for determining the pixel E as previously stated may be modified as $E=[E+(C+F)\times(D+G)]\times(A+B+C+D+F+G+H+I)$ to add anti-noise processing. Specifically, by adding "$\times(A+B+C+D+F+G+H+I)$" to the previously stated equation, it is possible to make E a ZERO even if it is a ONE, when all the surrounding pixels are a ZERO.

As described earlier, the two-level pixel data are reduced in density from the sixteen dots per millimeter to two dots per millimeter before being written in the memory 44. Such a decrease in the amount of data contributes not only to a decrease in memory capacity required but also to rapid processing of the inside/outside decision circuit 54. Reading the document 12 at the density of sixteen dots per millimeter is satisfactory with regard to the quality of image reproduction and becoming popular as a standard. In this regard, even if the marking sheet 10 is read at the density of two dots per millimeter, it is needless to replace it with the usual density of sixteen dots per millimeter because the specified region is merely used to erase or extract an image which lies in that region and not reproduced as it is. Further, the density of two dots per millimeter suffices in practice considering the fact that the line 14 on the sheet 10 is written by hand by using the felt pen 16 or the like. A good experimental result was achieved by using a felt pen which was about 1.0 to 1.5 millimeters in line width.

As described above, the first embodiment of the present invention writes data associated with a marking sheet in a memory after lowering their density and, thereby, not only reduces memory capacity required but also promotes rapid inside/outside decision processing with considerable freedom.

SECOND EMBODIMENT

The second embodiment realizes an apparatus applicable to a digital copier which is capable of selectively setting up image processing in the text mode and image processing in the graphic mode depending upon the kind of a document, particularly an apparatus which processes data associated with a marking sheet by using the text mode automatically.

Figure 13:
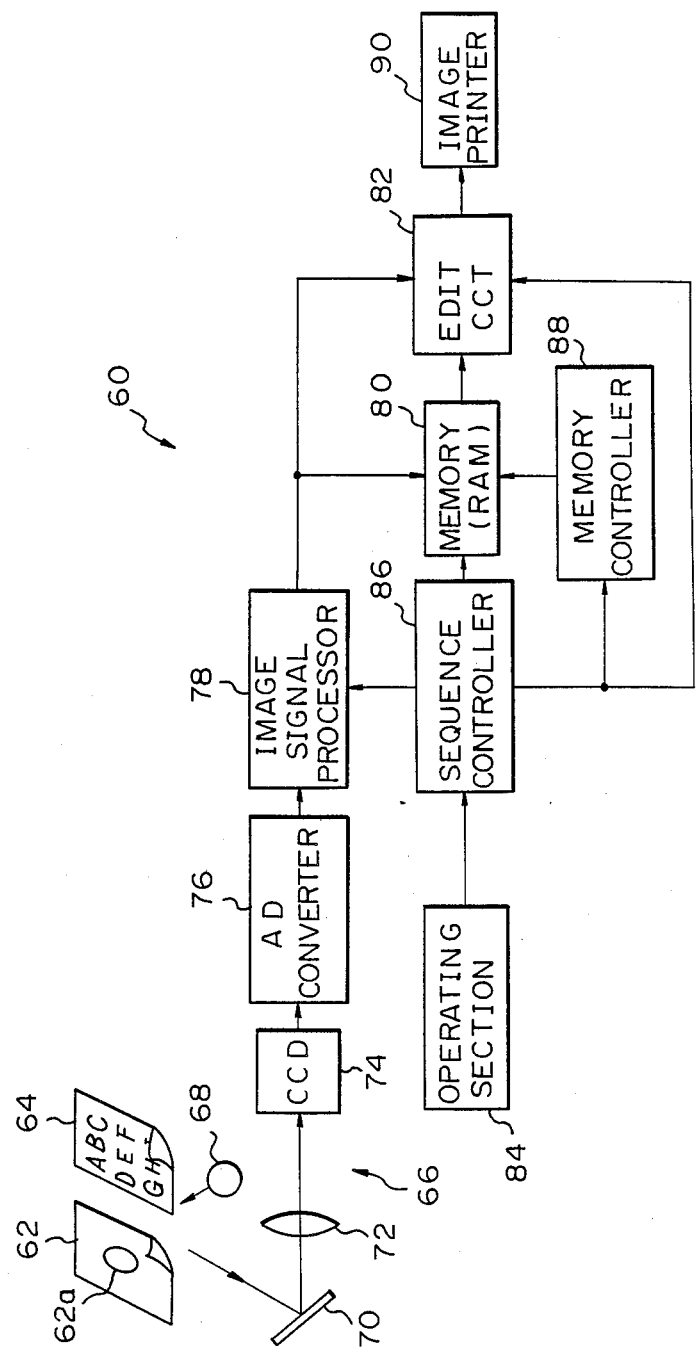
FIG. 13 is a schematic block diagram showing the overall construction of a second embodiment of the present invention.

Referring to FIG. 13, an apparatus 60 in accordance with the second embodiment is shown. A marking sheet 62 provided with a line 62a by way of example or a document printed with characters A and I is read by an image scanner 66. As shown, the image scanner 66 is made up of a light source 68, a mirror 70, a lens 72, and a CCD 74. While the sheet 62 or the document 64 is illuminated by the light source 68, light reflected by the sheet 62 is incident to the CCD 74 through the mirror 70 and lens 72. The output of the CCD 74 is applied to an analog-to-digital (AD) converter 76 to be thereby converted into n-bit digital image data. These digital image data are routed to an image signal processing circuit, or processor, 78. The image signal processor 78 processes the input digital image data in either one of the text and graphic modes so as to transform them into two-level, or black/white, pixel data. Specifically, in the text mode, for example, the image data are sliced at a predetermined threshold value while, in the graphic mode, they are subjected to a dither method or like halftone processing technique to reproduce tones in a false manner. The resulting two-level pixel data are applied to a memory 80 which is implemented with a RAM, and an editing circuit 82 which is adapted, for example, to extract or erase the particular region which is marked by the line 62a.

Figure 14:
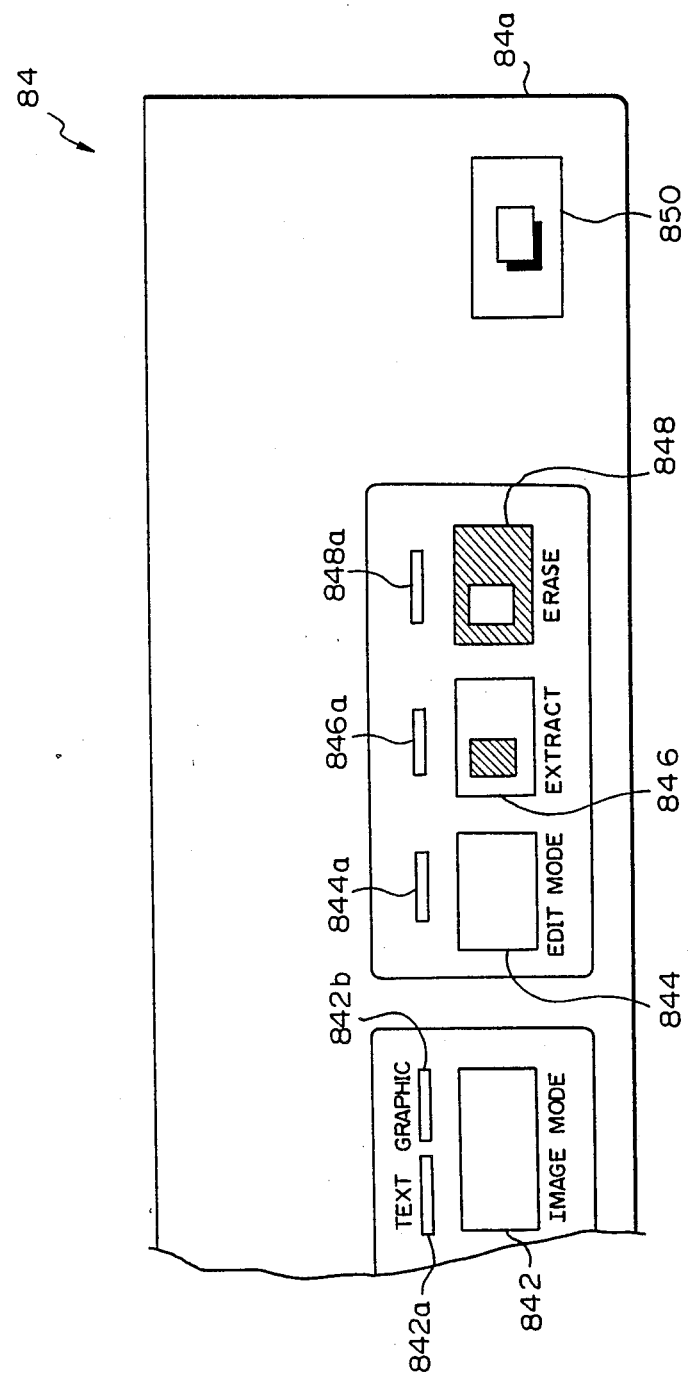
FIG. 14 is a fragmentary view of an operating section which is included in the embodiment of FIG. 13.

The text and graphic modes are selectively set up by a sequence controller 86 which responds to a command entered on an operating section 84 by controlling the image signal processor 78. As shown in FIG. 14, the operating section 84 includes an operation board 84a on which are provided an image mode key 842 for selecting either one of the text and graphic modes, an edit mode key 844 operable to extract or erase the region which is surrounded by the line 62a, and an extract mode key 846 for extracting the specified region when the edit mode key 844 is depressed, an erase key 848 for erasing the erasing the specified region when the same key 844 is depressed, and a start key 850. When the image mode key 842 is depressed, the text and graphic modes are set up alternately and indicated by LEDs 842a and 842b, respectively. Likewise, when the edit mode key 844, extract key 846 and erase key 848 are depressed, LEDs 844a, 846a and 848a, respectively, are turned on to display particular modes associated therewith. For example, assuming that the image mode key 842 is depressed to select either the text or the graphic mode, a signal representative of that mode is fed from the operating section 84 to the sequence controller 86 which in turns delivers a text/graphic mode change signal to the image signal processor 78.

The sequence controller 86 determines whether the document read by the image scanner 86 is the marking sheet 62 or the document 64. A memory controller 88 controls the memory 80 with respect to the write-in and read-out of image data. The editing circuit 82 produces two-level data by applying, for example, erase or extract processing to the image data associated with the sheet 62 and outputted by the memory 80 and those associated with the document 64 and outputted by the image signal processor 78, based on a control signal which is fed from the sequence controller 86. The two-level data may be delivered to an image printer 90 of the type having a thermal head.

Figure 15A:
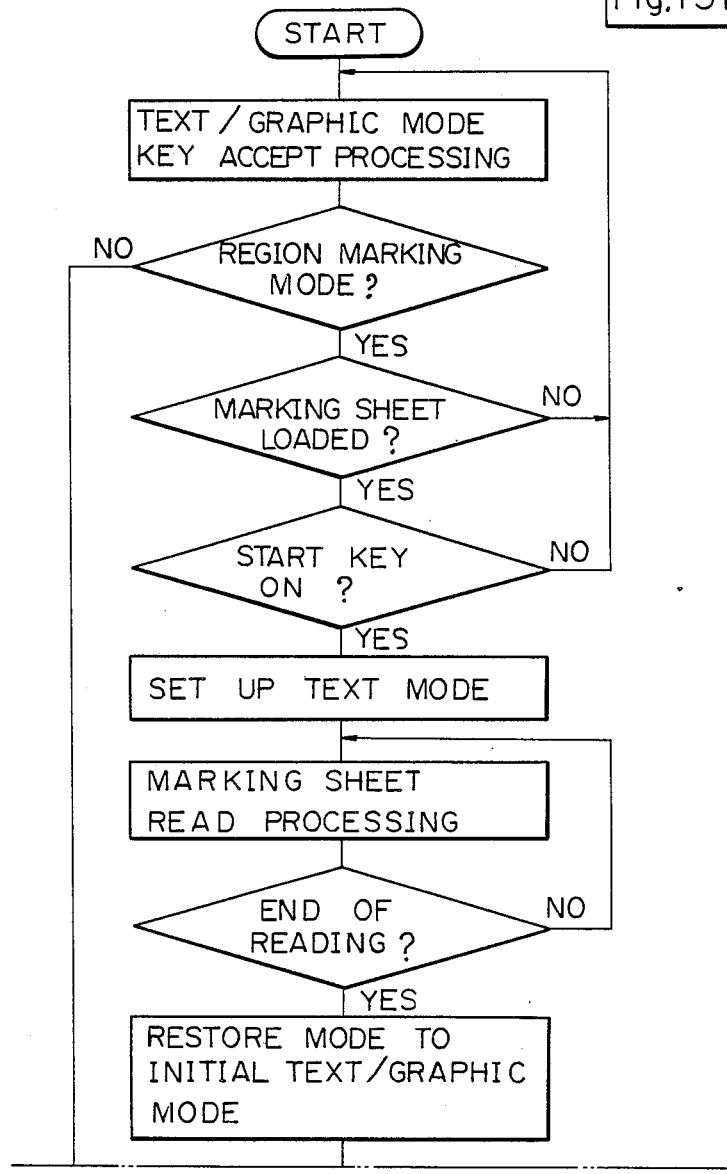
FIG. 15 is a flowchart demonstrating the operation of the second embodiment.
Figure 15B:
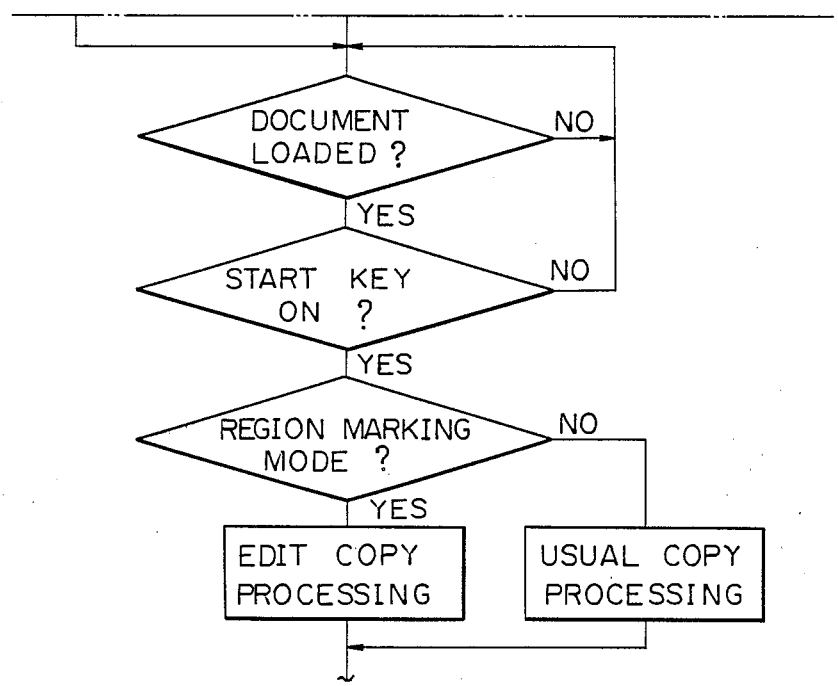

The operation of the apparatus 60 will be described with reference to FIG. 15. A person may manipulate the edit mode key 844 to set up an edit mode which specifies a particular region as desired, and then he or she may depress the image mode key 842 to enter the text mode or the graphic mode depending upon the kind of the document 64. When the operator selects the edit mode for specifying a particular region of the document 64, the operator loads the marking sheet 62 on which the line 62a has been written to mark a desired region of the document 64. The sequence controller 86 determines that the sheet 62 has been loaded. Subsequently, as the operator depressed the start key 850, the apparatus 60 automatically selects the text mode so that the region of the sheet 62 marked with the line 62a is written in the memory 80. Upon completion of the storage in the memory 80, the operation mode is restored to text or graphic which has been initially selected, followed by a sequence of ordinary copying steps. Hence, assuming that the document 64 is a photograph and, therefore, the graphic mode is selected, the text mode is automatically set up in the event when the sheet 62 is read and, then, automatically replaced with the graphic mode after the data associated with the sheet 62 has been fully written in the memory 80.

Details of the image signal processor 78, sequence controller 86, editing circuit 82, memory 80 and memory controller 88 will be described hereinafter. It is to be noted that the CCD 74, AD converter 76, image printer 90 and other such circuits can be implemented by means of circuits which per se are well known in the art and, therefore, details thereof will not be described.

Figure 16:
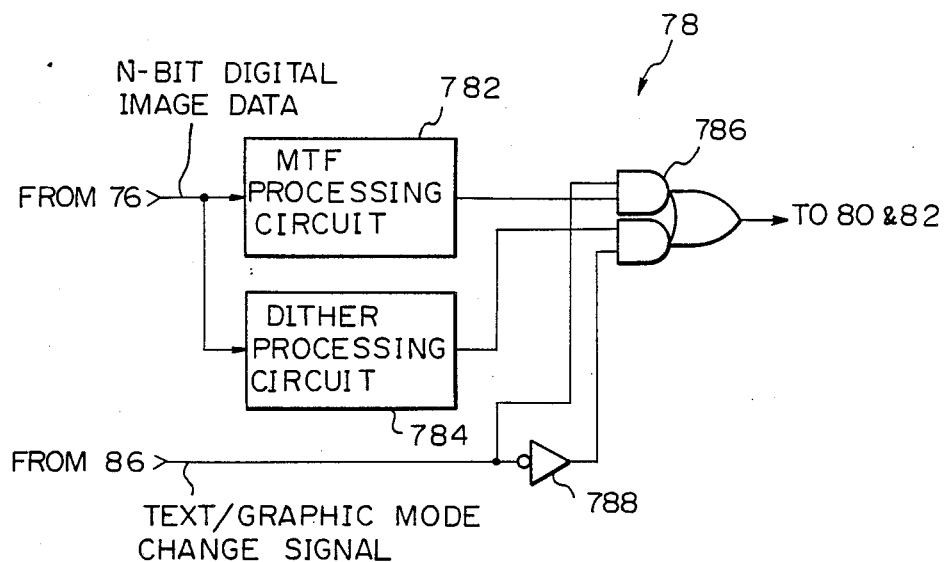
FIG. 16 is a schematic block diagram showing a specific construction of an image signal processing circuit of the second embodiment.

Referring to FIG. 16, a specific construction of the image signal processor 78 is shown and comprised of an MTF processor 782, a dither processor 784, a gate 786, and a gate 788. The n-bit digital image data outputted by the AD converter 76 are fed to the MTF processor 82 and dither processor 784. The MTF processor 782 emphasizes black/white by comparing data to be processed with surrounding data, then slices it at a predetermined threshold value, and then delivers the resulting data to the gate 786 as two-level pixel data. The dither processor 784 discriminates the n bits of digital image data by using individual threshold values which are arranged in a dither matrix, the resulting two-level or black/white pixel data being routed to the gate 786. Also routed to the gate 786, either directly or via the gate 788, is a text/graphic mode change signal which is outputted by the sequence controller 86. By the text/graphic mode change signal, either the two-level pixel data undergone MTF processing or those having undergone dither processing are selected and applied to the memory 80 and editing circuit 82.

Figure 17:
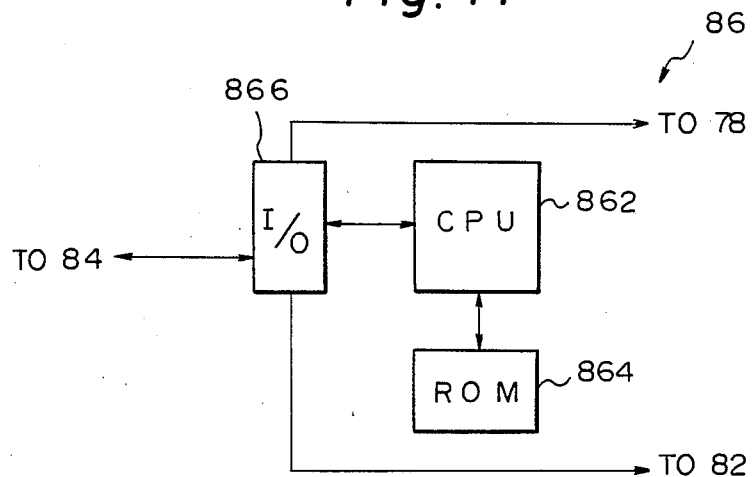
FIG. 17 is a schematic block diagram showing a specific construction of a sequence control circuit.

As shown in FIG. 17, the sequence controller 86 is constituted by a CPU 862, a ROM 864 connected to the CPU 862, and an I/O interface 866. In this construction, the CPU 862 has input thereto an output signal of the operating section 84 via the I/O interface 866 to see if the mode selected is the text mode or the graphic mode, and then feed a text/graphic mode change signal to the image signal processor 78, as guided by a sequence program which is stored in the ROM 864. As regards the discrimination between the sheet 62 and the document 64, the CPU 862 decides that the first document loaded after the selection of the edit mode is the sheet 62 and delivers a control signal representative of it to the editing circuit 82.

Figure 18:
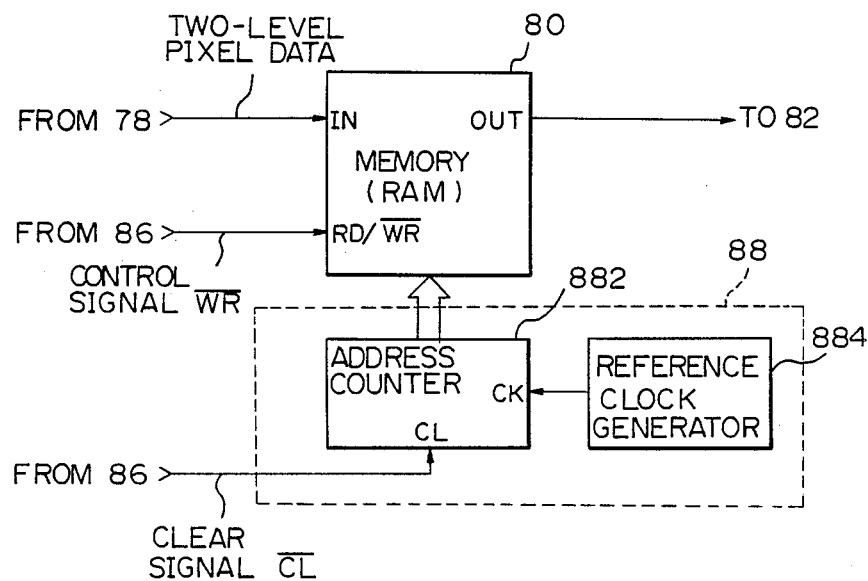
FIG. 18 is a schematic block diagram showing the combined construction of a memory control circuit and memory.
Figure 19:
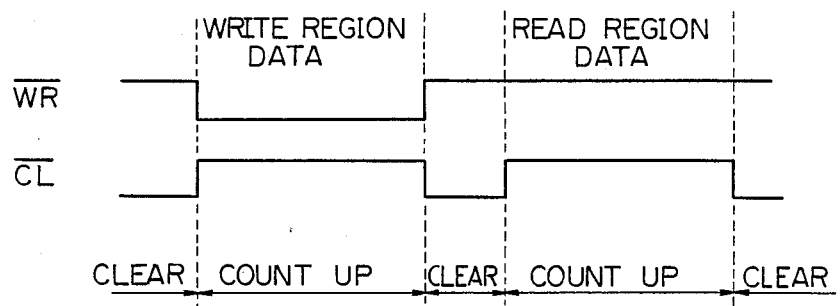
FIG. 19 is a timing chart showing various signals which appear in a memory control circuit of FIG. 18.

FIG. 18 shows a combined specific construction of the memory 80 (RAM) and memory controller 88 while FIG. 19 shows various signals appearing therein. As shown, the memory controller 88 is constituted by an address counter 882, and a reference clock generator 884 adapted to feed a reference clock to the address counter 882. A control signal $\overline{WR}$ outputted by the sequence controller 86 becomes low level while the sheet 62 is read. When the control signal $\overline{WR}$ is applied to the memory 80, the memory 80 is conditioned for a write mode. The address counter 882 counts the addresses of the memory 80 clocked by the reference clock and starts up-counting from "0", set by means of a clear signal $\overline{CL}$, which remains high level while an image is read. In this construction, when the control signal $\overline{WR}$ is low level, the address counter 882 starts up-counting so that data associated with the sheet 62 are sequentially written in the memory 80. In the event when the document 64 is read, both the control signal $\overline{WR}$ and the clear signal $\overline{CL}$ become high level with the result that the data are sequentially read out of the memory 80 and fed to the editing circuit 82.

Figure 20:
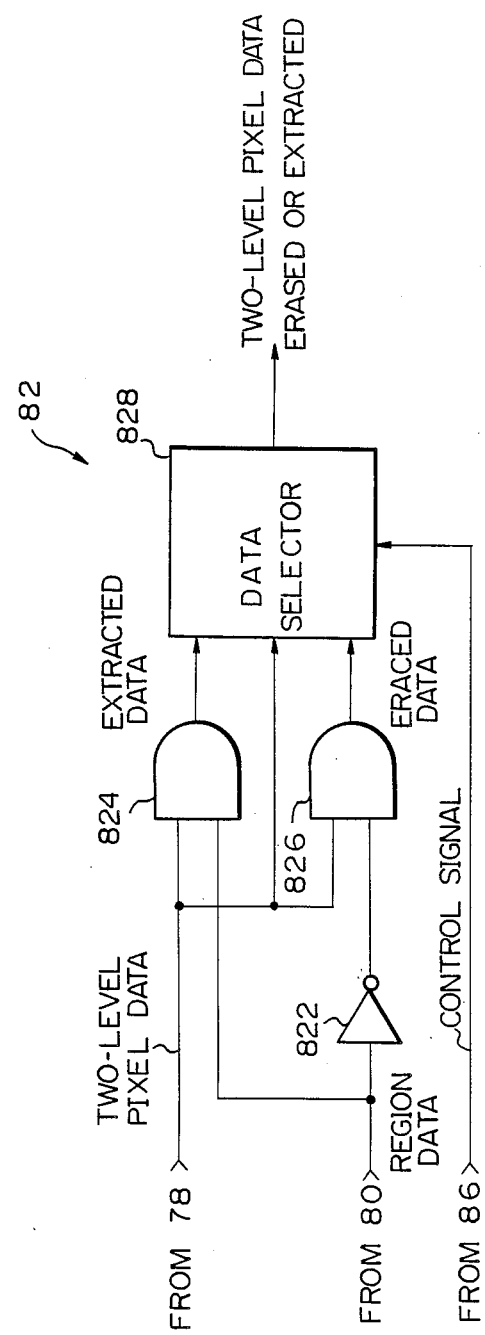
FIG. 20 is a schematic block diagram showing an editing circuit.

As shown in FIG. 20, the editing circuit 82 is made up of gates 822, 824 and 826, and a data selector 828. While the data representative of the sheet 62 as outputted by the memory 80 are low level for the marked particular region and high level for the other region outside of the marked region, the two-level pixel data from the image signal processor 78 are high level for black and low level for white. When it is desired to extract an image lying in the marked region, the region data and two-level pixel data are fed to the gate (AND) 824 the output of which is in turn applied to the data selector 828 as extracted data. On the other hand, to erase an image in the marked region, an inverted version of the region data outputted by the gate 822 and the two-level pixel data are applied to the gate (AND) 826 the output of which is in turn fed to the data selector 828 as erased data. Under the control of the control signal from the sequence controller 86, the data selector 828 selects the extracted data or the erased data and delivers the selected data to the image printer 90 as extracted or erased two-level pixel data. When the edit mode is not selected, the two-level pixel data from the image signal processor 78 are directly fed out via the data selector 828.

As described above, the second embodiment reads an marking sheet automatically setting up the text mode when the sheet is loaded. Specifically, only if a person selects a particular mode which matches with a document to be used, data associated with the marking sheet are surely written in a memory in the text mode. This eliminates the need for troublesome operations and, yet, prevents the data associated with the sheet from being erroneously recognized.

No doubt, the first and second embodiments shown and described may be combined with each other.

Figure 21:
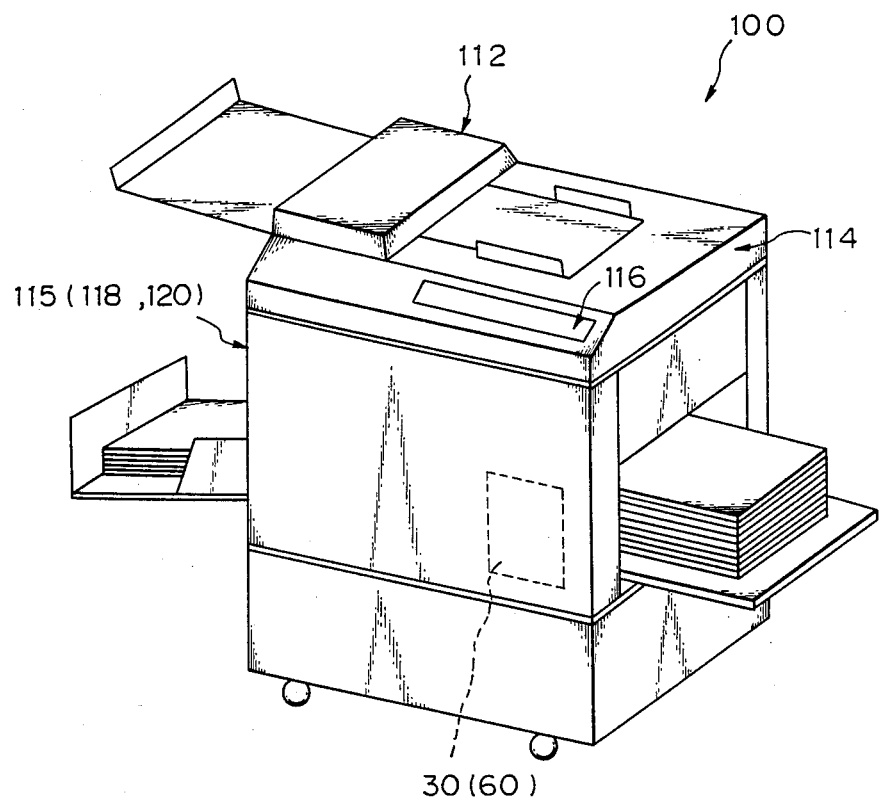
FIG. 21 is a perspective view of a printer using a mimeograph to which the present invention pertains.

Referring to FIG. 21 of the drawings, an example of the printer using a mimeograph to which the present invention pertains is shown and generally designated by the reference numeral 100. The printer 100 is generally constituted by an automatic document feeding section 112, a reading section 114 for reading an original document, an operating section 116, and a body 115 in which a mimeograph making section 118 for cutting a stencil, and a printing section 120 for supplying ink to the stencil cut by the section 118 are accommodated. Also accommodated in the body 115 is a controlling section 30 (60).

Figure 22:
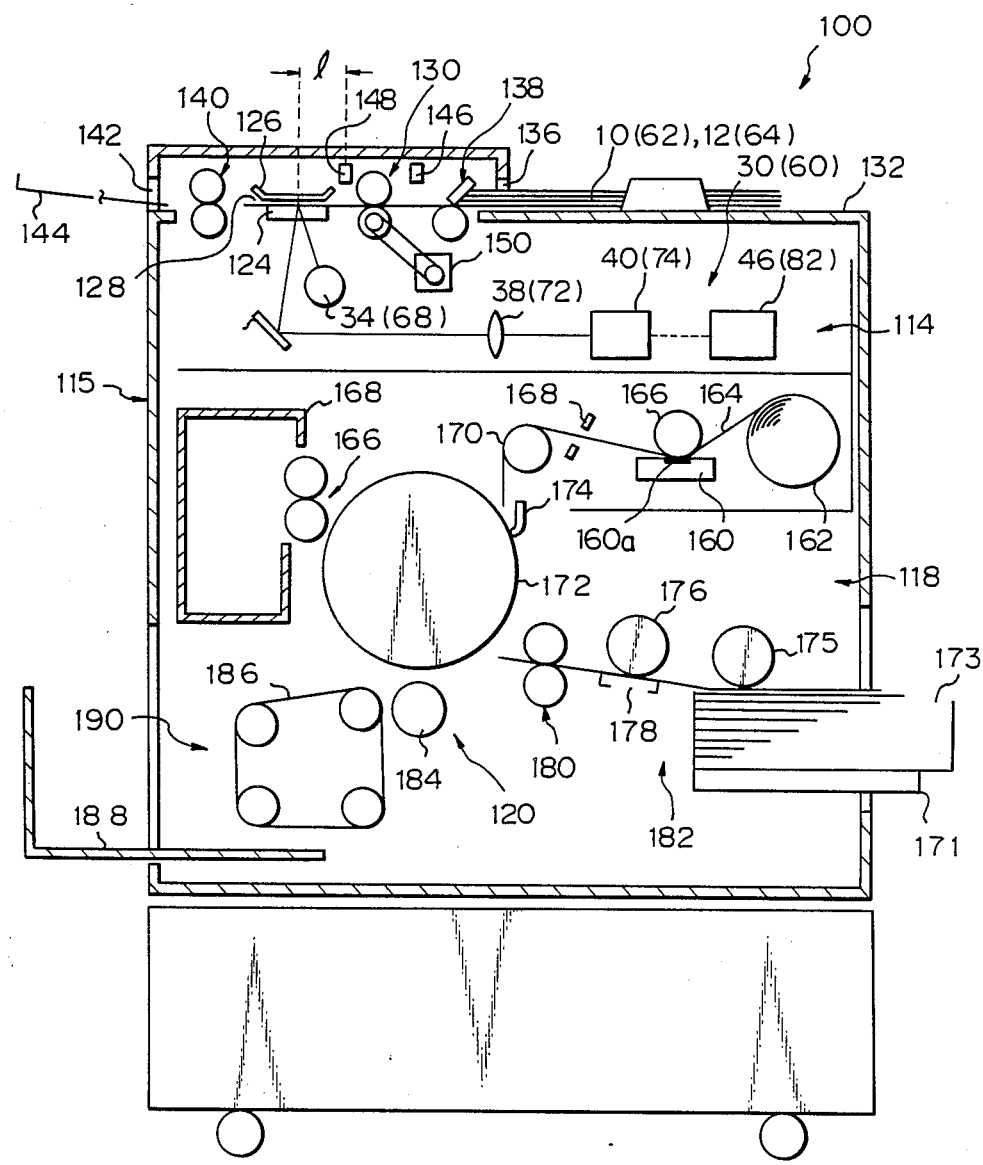
FIG. 22 is a vertical section showing a detailed construction of the printer shown in FIG. 21.

FIG. 22 shows the printer 100 in detail. As shown, the reading section 114 has a document transport path 128 which is defined by a glass platen 124 and an upper guide plate 126. A feed roller pair 130 is located at the upstream side of the transport path 128 so as to feed into the transport path 28 the sheets 10 (62) or documents 12 (64) which are sequentially inserted via an inlet 136 and separated by separator means 138, the lowermost document being fed first. Located at the downstream side of the transport path 128 is a discharge roller pair 140 which functions to drive the sheets 10 (62) or documents 12 (64) out of the transport path 128 onto a tray 144 via an outlet 142. The reading section 114 further includes a first sensor 146 responsive to the entry of a sheet or a document into the transport path 128, a second sensor 148 response to the leading edge of a sheet or a document, and a stepping motor 150 for driving the feed roller pair 30.

Disposed below the glass platen 124 are a fluorescent lamp 34 (68) adapted to illuminate a sheet or a document when the latter is transported to a predetermined exposure station, i.e., to substantially the center of the glass platen 124, a mirror 36 (70), a lens unit 38 (72), a CCD (charge coupled device) image sensor 40 (74) serving as a reading member, and the image processor 46 or the edit circuit 82 which constitute the apparatus 30 or 60.

The mimeograph making section 118 includes a thermal head 160 having a heating section 160a on its surface, and a platen roller 166 rotatable to transport a stencil 164 which is paid out from a roll 162 while urging the stencil 164 against the heating section 160a of the thermal head 160. Located in front of the stencil 164 with respect to an intended direction of stencil transport are a cutter 168 for cutting the stencil 164 at a predetermined length, and a transport roller 170 for driving the stencil 164 toward the printing section 120.

The printing section 120 includes a print drum 172 which wraps the stencil 164 fed from the mimeograph making section 118 therearound while clamping the stencil 164 by means of a clamp 174, a roller pair 166 for removing the stencil 164 from the drum print 172 at the end of printing and driving it to a collecting box 168, a sheet feed section 182 in which the uppermost one of paper sheets 173 which are stacked on a feed tray 171 is fed by a roller 175 while being separated from the others by a roller 176 and a separator blade 178 and driven toward the print drum 172 via a feed roller pair 180, a sheet discharge section 190 constituted by a belt 186 and a discharge tray 188 for discharging the paper sheet 178 on which data have been printed out by the print drum 172 and a press roller 184. The feed roller pair 180 is operative to feed the paper sheet 173 to between the print drum 172 and the press roller 184 in synchronism with tthe rotation of the drum 172. The print drum 172 is provided with an ink supply section thereinside so as to press the paper sheet 173 in cooperation with the press roller 184, whereby ink is transferred to the paper sheet 173 via apertures which are formed through the stencil 164. The print drum 172 is constructed into a drum unit together with an ink container, an ink supply pump, an ink supply unit and others, not shown. A plurality of drum units such as those individually containing black ink and red ink are selectively usable with the drum unit. For details of a drum unit mounting and dismounting structure, a reference may be made to Japanese Laid-Open Utility Model Publication (Kokai) No. 61-85462.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for reading an image of a mark provided on a marking sheet which marks a desired region of a document image printed on an original document and producing data associated with said marking sheet, reading said document image of the original document, storing data associated with said marking sheet in a memory, and processing said document image, in a predetermined editing mode, said apparatus comprising:

binarizer means for reading said marking sheet and said document image to convert said mark and document images into respective two-level pixel data;

density conversion means for thinning said two-level image data associated with an image of said marking sheet and controlling said memory such that the thinned two-level image data are written in said memory as associated thinned pixel data;

inside/outside decision means for discriminating said pixel data stored in said memory with respect to whether said pixel data relate to a region inside or outside of said marked region and processing said pixel data in dependence on whether said data related to inside and outside regions of said marked region based on said predetermned editing mode; and image processor means synchronously having applied thereto said pixel data associated with said marking sheet and stored in said memory and pixel data associated with corresponding regions of said document and outputted by said binarizer means, for applying image processing to said document in said predetermined editing mode;

wherein said density conversion means comprises a density conversion timing circuit for reducing the number of said two-level pixel data associated with said image of said marking sheet, said density conversion timing circuit comprising a thinining circuit for thining said pixel data associated with said image of said marking sheet in each of a column address direction and a row address direction with respect to said memory.

2. An apparatus as claimed in claim 1, wherein said thinning circuit comprises means for extracting one pixel out of each of a predetermined number of pixels in each of said column and row address directions.

3. An apparatus for reading an image of a mark provided on a marking sheet which marks a desired region of a document printed on an original document and producing data associated with the image of said mark, reading said document image of said original document, storing data associated with the image of said mark in a memory, and applying image processing to said document image, in a predetermined editing mode and a predetermined image mode, said apparatus comprising:

an AD (analog-to-digital) converting means for reading said image of said mark of said marking sheet and said document image and converting respective resulting image data into respective digital image data;

image signal processor means for processing said digital image data in said predetermined image mode to transform said digital image data into two-level pixel data and writing said pixel data in said memory;

sequence controller means for determining if it is said document image or said image of said marking sheet that has been read by said scanner, and commanding said image signal processor means to process said digital image data in a selected image mode; and editing means, supplied with said pixel data associated with said image of said marking sheet and read out of said memory and said pixel data associated with said document image and outputted by said image signal processor means, for applying image processing to said document image in said predetermined editing mode;

wherein said image mode comprises a text mode for applying MTF (modulation transfer function) processing to said digital image data to slice said image data at a predetermined threshold value, and a graphic mode for subjecting said digital image data to halftone processing.

4. An apparatus according to claim 3, wherein said sequence controller means commands said image signal processing means to automatically process said digital image data in said text mode during reading of said image of said mark.

5. An apparatus for reading an image of a mark provided on a marking sheet which marks a desired region of a document printed on an original document and producing data associated with the image of said mark, reading said document image of said original document, storing data associated with the image of said mark in a memory, and applying image processing to said document image, in a predetermined editing mode and a predetermined image mode, said apparatus comprising:

an AD (analog-to-digital) converting means for reading said image of said mark of said marking sheet and said document image and converting respective resulting image data into respective digital image data;

image signal processor means for processing said digital image data in said predetermined image mode to transform said digital image data into two-level pixel data and writing said pixel data in said memory;

sequence controller means for determining if it is said document image or said image of said marking sheet that has been read by said scanner, and commanding said image signal processor means to process said digital image data in a selected image mode; and editing means, supplied with said pixel data associated with said image of said marking sheet and read out of said memory and said pixel data associated with said document image and outputted by said image signal processor means, for applying image processing to said document image in said predetermined editing mode;

wherein said image signal processor means comprises an MTF (modulation transfer function) circuit for applying MTF processing in a text mode to said digital image data which are outputted by said AD converter means, a halftone processing circuit for applying a halftone processing to said digital image data in a graphic mode, and gating means supplied with outputs of said MTF circuit and halftone processing circuit for outputting said pixel data based on said predetermined image mode which is commanded by said sequence controller means.

6. An apparatus according to claim 5, wherein said sequence controller means commands said gating means of said image signal processor means to output pixel data which have undergone MTF processing in said text mode upon reading of said image of said mark.

7. An apparatus for reading an image of a mark provided on a marking sheet which marks a desired region of a document printed on an original document and producing data associated with the image of said mark, reading said document image of said original document, storing data associated with the image of said mark in a memory, and applying image pocessing to said document image, in a predetermined editing mode and a predetermined image mode, said apparatus comprising:

an AD (analog-to-digital) converting means for reading said image of said mark of said marking sheet and said document image and converting respective resulting image data into respective digital image data;

image signal processor means for processing said digital image data in said predetermined image mode to transform said digital image data into two-level pixel data and writing said pixel data in said memory;

sequence controller means for determining if it is said document image or said image of said marking sheet that has been read by said scanner, and commanding said image signal processor means to process said digital image data in a selected image mode; and editing means, supplied with said pixel data associated with said image of said marking sheet and read out of said memory and said pixel data associated with said document image and outputted by said image signal processor means, for applying image processing to said document image in said predetermined editing mode;

wherein said editing mode comprises an erase mode for erasing a part of said document image which lies in said marked region, and an extract mode for extracting only said part of said document image;

wherein said editing means comprises a gate supplied with said pixel data associated with said marking sheet and read out of said memory and said pixel data associated with said document and outputted by said image signal processor means for selectively producing an erase or an extract signal which command, respectively, image processing in an erase mode or image processing in an extract mode, and a data selector for selecting either one of said erase and extract signals in response to a command from said sequence controller means.

* * * * *